United States Patent
Phelps et al.

(10) Patent No.: US 7,216,273 B2
(45) Date of Patent: May 8, 2007

(54) METHOD FOR TESTING NON-DETERMINISTIC DEVICE DATA

(75) Inventors: Brian C. Phelps, Simi Valley, CA (US); Jonathan M. Hops, Thousand Oaks, CA (US); Jacob S. Scherb, Canoga Park, CA (US)

(73) Assignee: Teradyne, Inc., Boston, MA (US)

( * ) Notice: Subject to any disclaimer, the term of this patent is extended or adjusted under 35 U.S.C. 154(b) by 459 days.

(21) Appl. No.: 10/606,848

(22) Filed: Jun. 26, 2003

(65) Prior Publication Data

US 2004/0268199 A1    Dec. 30, 2004

(51) Int. Cl.
    *G01R 31/28* (2006.01)
(52) U.S. Cl. ............ 714/724; 714/715
(58) Field of Classification Search ............ 714/724, 714/735–738, 715
    See application file for complete search history.

(56) References Cited

U.S. PATENT DOCUMENTS

| | | | | |
|---|---|---|---|---|
| 4,646,299 | A * | 2/1987 | Schinabeck et al. | 714/736 |
| 6,789,224 | B2 * | 9/2004 | Miura | 714/744 |
| 6,985,581 | B1 * | 1/2006 | Callum | 380/2 |
| 2002/0188888 | A1 * | 12/2002 | Rivoir | 714/25 |
| 2004/0107395 | A1 * | 6/2004 | Volkerink et al. | 714/732 |
| 2004/0267487 | A1 * | 12/2004 | Brown et al. | 702/120 |
| 2006/0116840 | A1 * | 6/2006 | Hops et al. | 702/117 |

FOREIGN PATENT DOCUMENTS

IN    1089293 A1 *   4/2006

OTHER PUBLICATIONS

"TRIM: Testability Range by Ignoring the Memory" by Carter et al. in IEEE Transactions on Computer-Aided Design of Integrated Circuits and Systems Publication Date: Jan. 1988 vol. 7, Issue: 1 On pp: 38-49 INSPEC Accession No. 3130635.*

* cited by examiner

*Primary Examiner*—Cynthia Britt
(74) *Attorney, Agent, or Firm*—Wolf, Greenfield & Sacks P.C.

(57) ABSTRACT

A method for testing semiconductor devices that output non-deterministic entity information such as packet and control signals is disclosed. The method includes the steps generating test signals with a semiconductor tester and applying the generated test signals to the device-under-test. Actual output entities from the DUT in response to the applied generated test signals are captured by the tester and compared to expected output entities. If a failure is identified in the comparing step, the method defines a window of valid expected entities and compares the failed actual output entity to the window of valid expected entities. If a match occurs between the failed actual output entity and any of the expected entities in the window, the actual entity is deemed valid.

15 Claims, 6 Drawing Sheets

METHOD FOR TESTING NON-DETERMINISTIC DEVICE DATA

FIELD OF THE INVENTION

The invention relates generally to automatic test equipment, and more particularly to a method for enabling the testing of non-deterministic semiconductor device data.

BACKGROUND OF THE INVENTION

Test is an important step in the manufacture of semiconductor devices. The automatic test equipment (ATE), or testers, employed to carry out this task comprises sophisticated electronics capable of sending test signals to, and capturing output signals from, one or more devices under test (DUTs). ATE software often helps to orchestrate this back and forth flow of signals.

Conventional testers, as shown in FIG. 1, feed tester data signals (drive data) originating from a pattern generator 12 to a device-under-test (DUT) 14 via interface circuitry commonly referred to as pin electronics 16. Response signals from the DUT are captured and compared to expected data with the resulting comparison data fed to a failure processor 18 in order to determine pass or fail conditions. The "expected" and "drive" data are typically programmed in the pattern generator vector memory (not shown) to occur at precise timings, in accordance with how the DUT should behave. If the data captured from the DUT fails to correspond with an expected condition, the device is considered to have failed that aspect of the test.

Modern semiconductor devices are trending towards employing multiple processing cores on the same piece of silicon, or chip. Adding to this complexity is the overall trend towards implementing on-chip communication protocols including, for example, Rapid I/O, Hypertransport, and specialized bus architectures such as DDR and source synchronous, etc. The end result is an exponential increase in the chip gate count, yet only modest increases in the available pin counts. Consequently, multiple sub-circuits often share the pins (interface).

This shared interface scheme is illustrated generally in FIG. 2, where a plurality of device-under-test subcircuits 20a–20c send data packets to a DUT communications port 22. The communications port serves as the gatekeeper to accessing the DUT output pin 24. Each of the subcircuits may be clocked by a separate clock having a frequency different from not only the other subcircuits, but also possibly different from the communications port clock. An asynchronous arbitrator 26 handles the sequencing of the data packets to the DUT output pin.

During typical DUT operation, as shown in FIG. 3, the shared interface scheme may cause a problem (for conventional ATE) known as "out-of-order data". This situation often results from the subcircuits attempting to access the communications port 22 (FIG. 2) on the same clock edge, or having differing delays due to environmental conditions. FIG. 3 illustrates the general concept on how an expected sequencing may be disturbed into an out-of-order packet sequence. The "out of order" data problem presents a unique challenge to automatic test equipment, which is conventionally dependent on deterministic data from the DUT.

What is desired and currently unavailable is a test solution for non-deterministic data that provides substantially real-time validation results and maximizes flexibility for the device manufacturer while reducing test costs. The apparatus and method of the present invention provides such a solution.

SUMMARY OF THE INVENTION

The present invention provides the ability for automatic test equipment to quickly validate non-deterministic data, such as "out of order" data received from a device-under-test. This ability is available with little to no impact to the automatic test equipment hardware, and is universally applicable to many protocols. With the availability of such a solution, users of the automatic test equipment will experience significant test throughput improvements and reduced test costs.

To realize the foregoing advantages, the invention in one form comprises a method for testing semiconductor devices that output non-deterministic entity information such as packet and control signals. The method includes the steps generating test signals with a semiconductor tester and applying the generated test signals to the device-under-test. Actual output entities from the DUT in response to the applied generated test signals are captured by the tester and compared to expected output entities. If a failure is identified in the comparing step, the method defines a window of valid expected entities and compares the failed actual output entity to the window of valid expected entities. If a match occurs between the failed actual output entity and any of the expected entities in the window, the actual entity is deemed valid.

Other features and advantages of the present invention will be apparent from the following detailed description when read in conjunction with the accompanying drawings.

BRIEF DESCRIPTION OF THE DRAWINGS

The invention will be better understood by reference to the following more detailed description and accompanying drawings in which.

DETAILED DESCRIPTION OF THE INVENTION

The present invention provides a way to test semiconductor devices that employ communications protocol ports that often generate non-deterministic output data exhibiting out-of-order results. This is accomplished through the use of automatic test equipment 30 (FIG. 4) that employs software utilizing a unique method of analyzing and processing the non-deterministic data for a determination of data validity.

Figure 1:
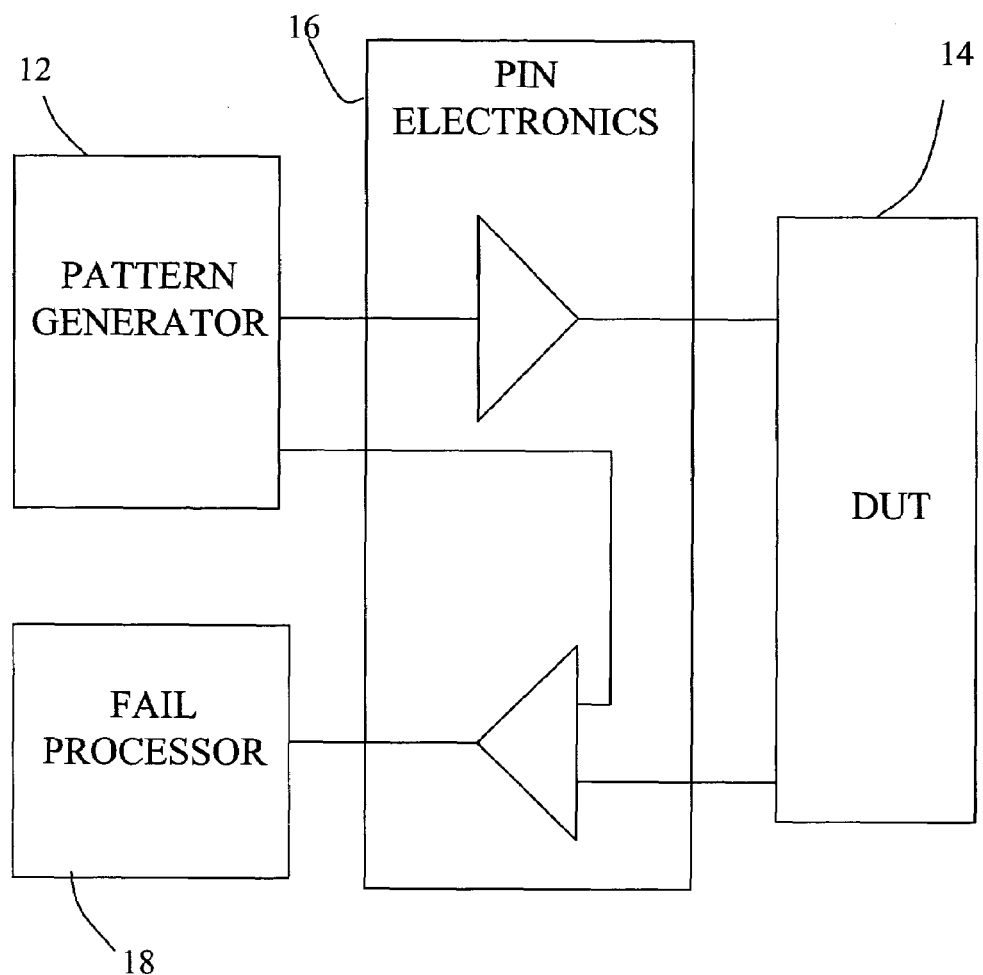
FIG. 1 is a high-level block diagram of a conventional ATE architecture for driving data to a DUT and comparing the DUT response data to expected data.
Figure 2:
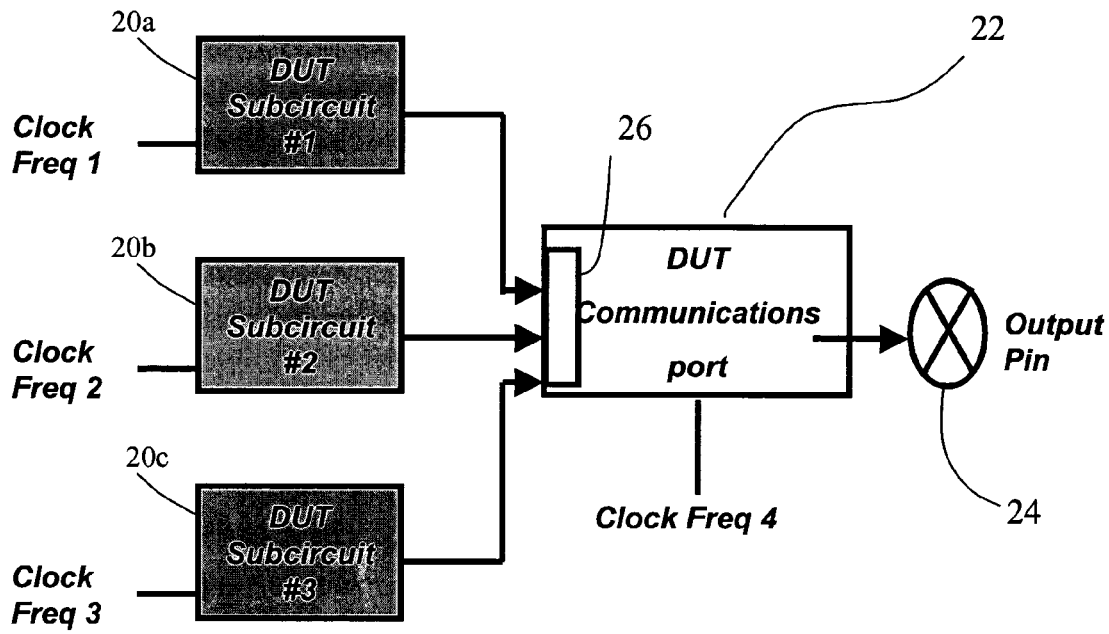
FIG. 2 is a high-level block diagram of a DUT output interface architecture.
Figure 3:
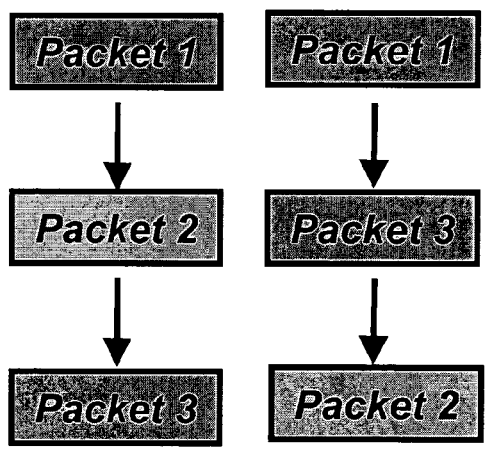
FIG. 3 is a block diagram illustrating the out of order problem resulting from the DUT output scheme of FIG. 2.
Figure 4:
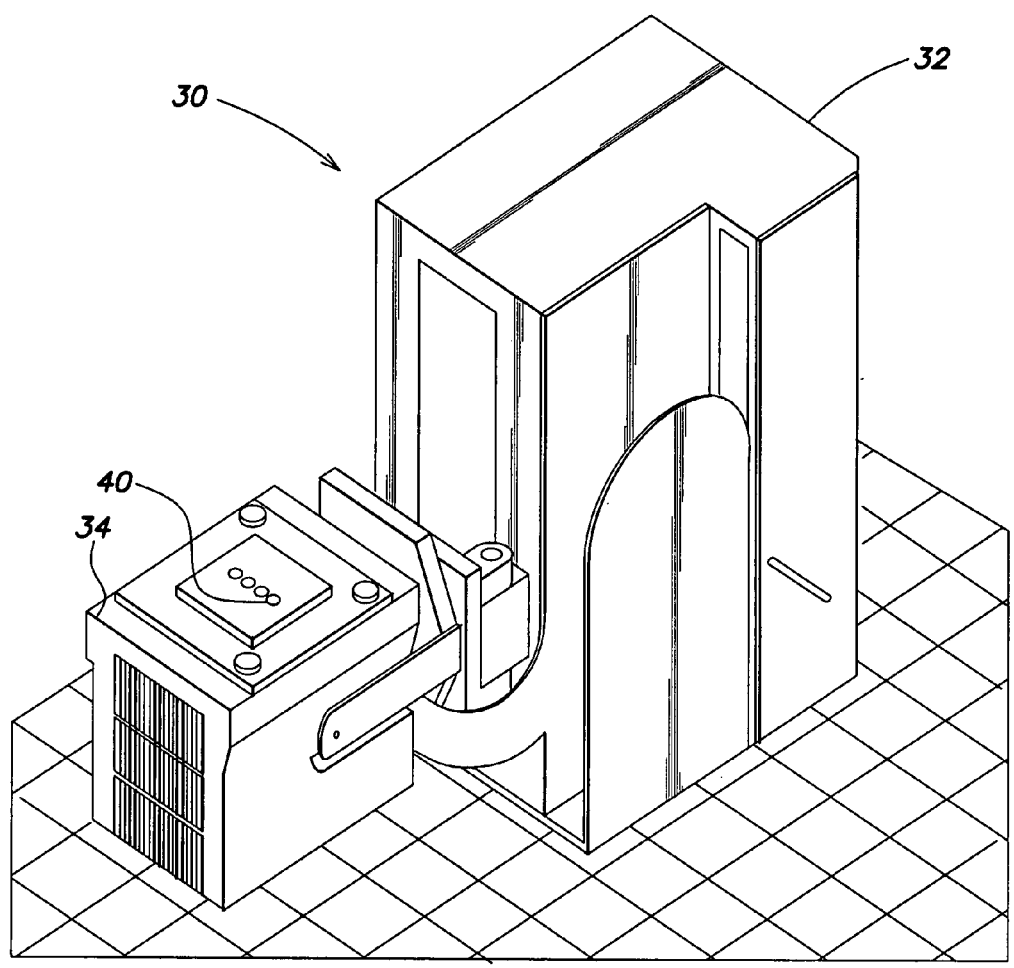
FIG. 4 is an elevated perspective view of a semiconductor tester employing the method of the present invention.

Referring now to FIG. 4, the automatic test equipment 30, often referred to as a semiconductor tester, includes a main frame 32 coupled to a testhead 34. The testhead houses the various instruments desired by the user to adequately test a device-under-test DUT 40. The instruments generally comprise large circuit boards, or channel cards, that mount within the testhead in order to interface with the DUT in a controlled fashion. The channel cards include the hardware resources that are responsive to ATE software in order to carry out the testing of the DUT. Included in the hardware resources for each board are memories (not shown) that store the test patterns, expected DUT results and the captured DUT results used for carrying out the method of the present invention.

Figure 5:
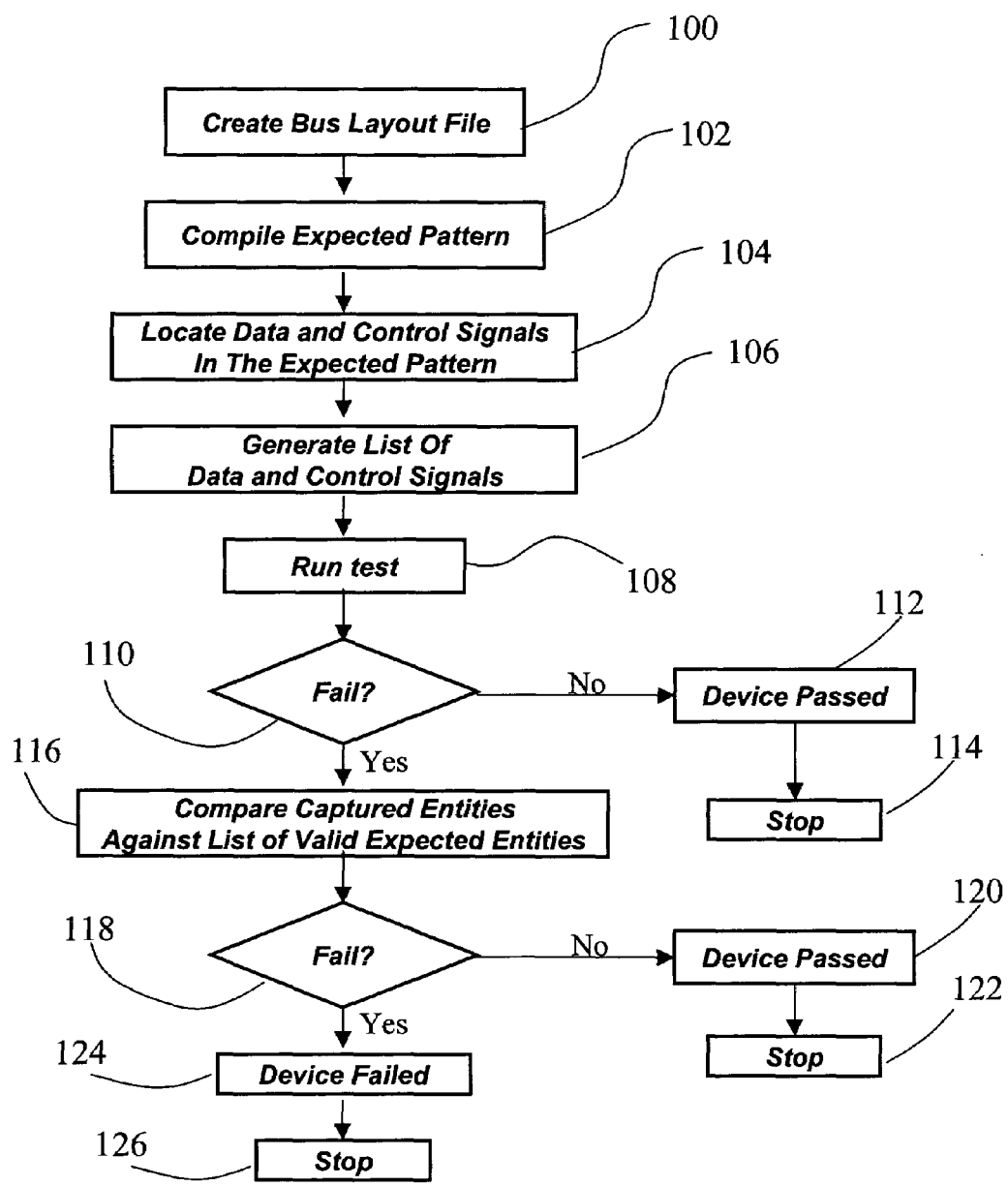
FIG. 5 is a flowchart illustrating steps included in one form of the present invention.

With reference now to FIG. 5, the method of the present invention involves steps to analyze and process the test information gathered from the DUT by the tester. The method is tailored to enable the tester to evaluate data from the DUT that is "non-deterministic", or does not conform to rigid expected results. In other words, the method allows the tester to capture actual data from the DUT, compare it to expected data, and if no match occurs, carry out further processing to determine if the device still operates within acceptable parameters.

Further referring to FIG. 5, the method of the present invention lends itself well as a modification to existing ATE software packages, such as that known under the trademark Image™, licensed by Teradyne, Inc., Boston, Mass., to users of its automatic test equipment. Generally, ATE software compiles test patterns for application to the device-under-test (DUT), including expected results that are compared to the actual results captured from the DUT. Modifying this general approach to enable the tester to handle non-deterministic data involves first creating a bus layout file, at step 100.

The bus layout file created at step 100 includes information describing the DUT communications protocol bus architecture. For example, the file includes a parameter identifying how far out of order the actual DUT output packet and/or control signals (collectively referred to as "entities") can be sequenced with respect to the expected order without violating the device operating specifications. This parameter may be referred to as the device "complexity." Additionally, the bus layout file includes pin and frame mapping data to identify DUT pins that define the bus, and pins that represent bits on the bus. Further, the frame signal pin is also identified in the bus layout file.

Once the bus layout file is created, the expected pattern may be compiled, at step 102. As noted above, the expected pattern is a sequence of packets and control signals that the tester uses to compare actual DUT output data against to determine data validity. This step is similar to conventional compiling steps for ATE software, but includes the capability of identifying both packets and control symbols in a pattern file. This is accomplished by locating the entities in the expected pattern, at step 104, and generating a list of the entities, at step 106.

Each entity in the list includes information such as whether it is a packet or control signal, the "entity order" (its sequential order number in the data sequence relative to other packets and control signals), its typeorder (sequential order number relative to other packets OR control signals), and its start address and end address in the pattern memory (not shown).

Once the preliminary compiling and list generating steps are complete, one of potentially many tests may be performed on the DUT, at step 108. As generally described above, each test involves applying test waveforms to the device, and capturing the response data from the DUT. The test step includes the initial comparison between the expected entities, and the actual entities captured from the DUT during the test, and stored in a capture memory (not shown).

If the entire pattern of expected entities match up with the actual entities at the determination step 110, then the device is considered to have passed the test, at step 112, and processing stops, at step 114.

However, if at the determination step 110 a fail is detected (a mismatch between an expected entity with an actual entity at a specific DUT cycle), then a modified "compare" step is performed that compares the captured entities against a list of valid expected entities, at step 116.

Figure 6:
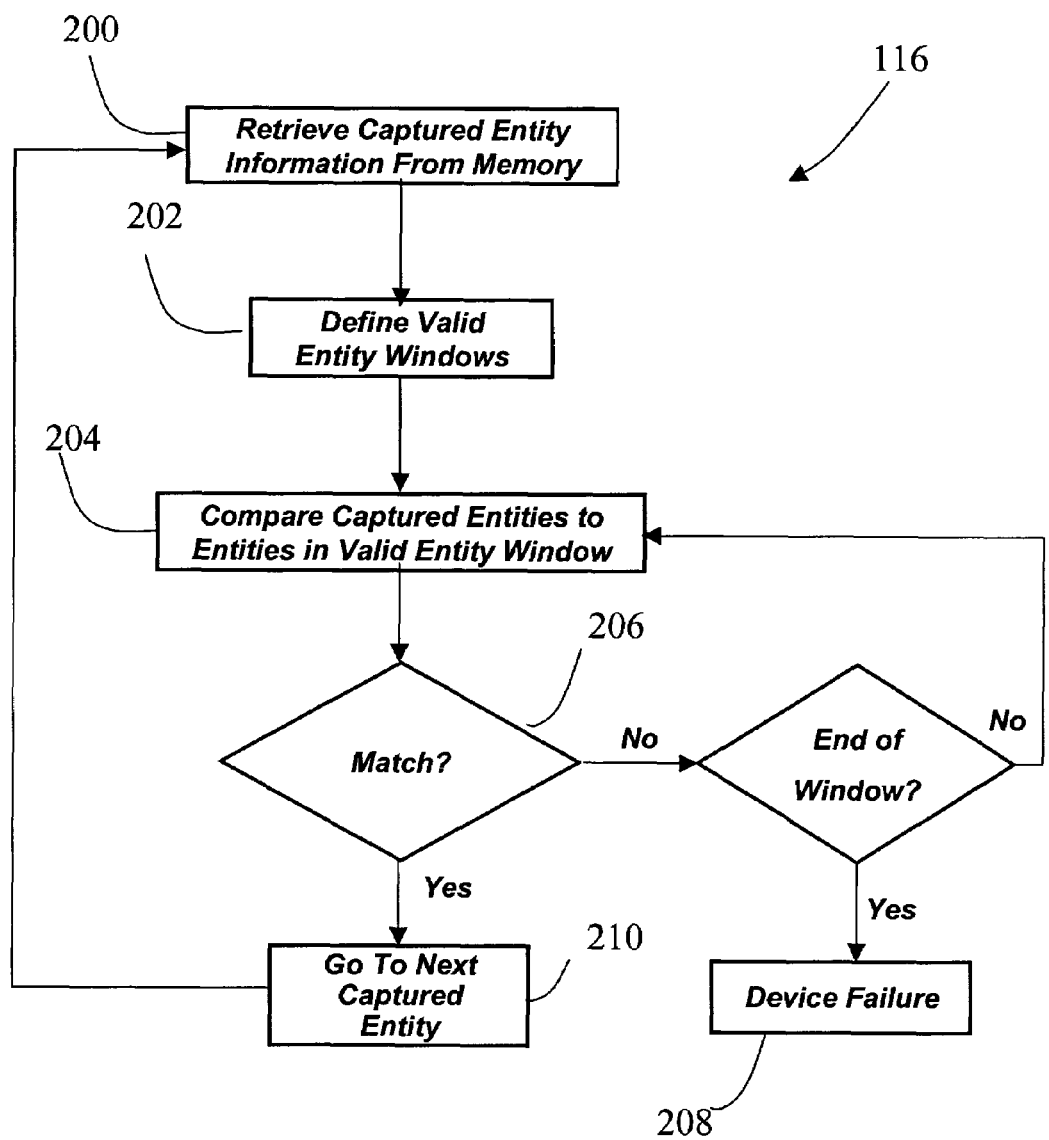
FIG. 6 is a flowchart illustrating more specific steps for the compare step of FIG. 5.

The enhanced compare step, at step 116 of FIG. 5, is more fully shown in FIG. 6, and explained in more detail below. The step includes first retrieving, at step 200, the captured actual data from the capture memory (not shown). Once the data is retrieved, a valid packet "window" is then defined, at step 202.

Defining the window, at step 202 involves accesssing the bus layout file to determine the entity complexity (how far out of order the entity is allowed to be). The entity's "typeorder" is also considered (where the entity should be in relation to other entities of the same type). In essence, these entity windows define the allowable range of non-determinism that each entity can have to still be considered valid data. The maximum number of valid entities in the window is defined by the relationship:

size=(2*complexity)−1

In other words, the maximum size of the window is essentially twice the allowable "complexity" (the number of DUT subcircuits competing to send an output to the single DUT communications port). Thus, if a particular entity was supposed to show up at a certain cycle (in the original expect pattern), it was actually valid if it occurred anywhere within the window defined above.

Figure 7:
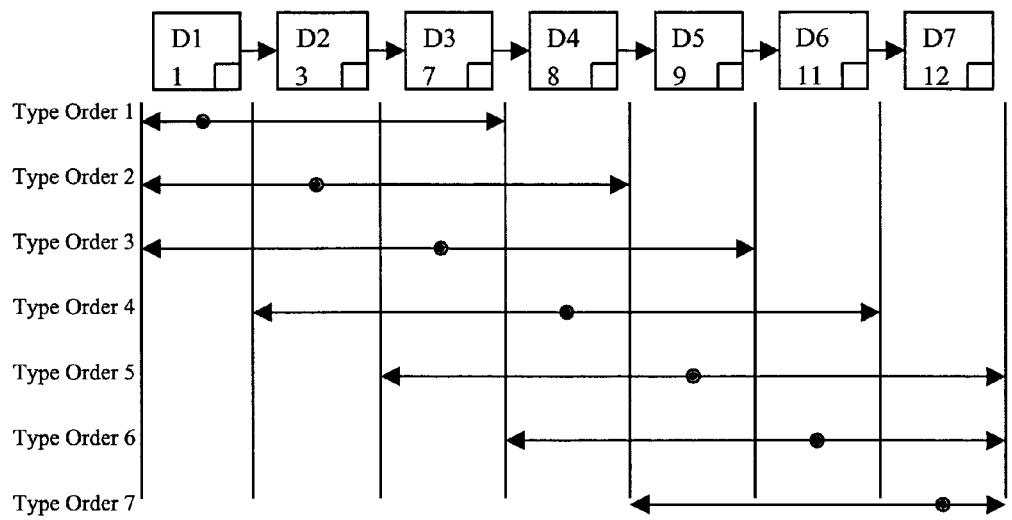
FIG. 7 is a graphical representation of a valid entity window in accordance with the method shown in FIG. 5.

The boundaries of the window are determined by a comparison of the "typeorder" number to the entity's complexity. For instance, if the entity was expected as the first entity, then the window would not be able to extend into negative numbers. The window boundaries may be conveniently defined by identifying the typeorder number and ensuring that C-1 (where C is the entity complexity) positions are available on each side of the entity for the window. If the positions are unavailable, then the lower or upper boundary of the window is the start/end of the entity data. For purposes of clarity, FIG. 7 illustrates an example for a series of packet entities, with different defined windows depending on the TypeOrder (each with a complexity of three).

The captured entity is then compared to one of the expected entities in the window, at step 204. If a match occurs at the determining step 206, then the method iterates, beginning with step 200, to retrieve the next originally failing captured entity, and construct its window, at step 202. If no match occurs at the determining step 206, then another determination is made, at step 207 whether the end of the window has been reached (all of the entities in the window have been compared). If the end of the window is reached, then the device fails, at step 208. If the window still has uncompared entities, then the comparison step 204 is reperformed with the next entity in the window.

If all of the captured entities match an entity within their respective windows, then the device is considered to have passed, at step 120 (FIG. 5) and processing stops, at step 122. Otherwise, as noted above, the device fails, at step 124 (FIG. 5) with processing halted, at step 126. An expected entity that has already passed cannot be reconsidered as part of a valid window. It will exist in the window, but not be considered for comparison As noted above, the enhanced comparison step overrides conventional ATE software by enabling it to handle non-deterministic data situations, as needed, without wholesale modifications to the tester hardware resources. Consequently, the method of the present invention may be conveniently employed in existing ATE systems with little additional cost.

Those skilled in the art will recognize the many benefits and advantages afforded by the present invention. Of significant importance is the throughput improvement made possible by the capability of further determining the validity of non-deterministic data that originally failed the initial test comparison. By evaluating an entity's validity within a window of acceptable parameters, or range of acceptable operating cycles, more acceptable devices will pass testing procedures. This correspondingly reduces the device manufacturers costs.

While the invention has been particularly shown and described with reference to the preferred embodiments thereof, it will be understood by those skilled in the art that various changes in form and detail may be made therein without departing from the spirit and scope of the invention.

What is claimed is:

1. A method for testing semiconductor devices that output non-deterministic entity information, the method including the steps:
    generating test signals with a semiconductor tester;
    applying the generated test signals to the device-under-test (DUT);
    capturing actual output entities from the DUT in response to the applied generated test signals;
    comparing the actual output entities to expected output entities, the actual output entities and the expected output entities each being ordered to create a correspondence between the actual output entities and the expected output entities, and identifying a failed actual output entity where a comparison fails to match an actual output entity to a corresponding expected output entity; and
    when a failed actual output entity is identified in the comparing step, defining a window of valid expected entities relative to the corresponding expected output entity and comparing the failed actual output entity to expected output entities in the window of valid expected entities.

2. A method according to claim 1 and further including the step:
    substituting the fail condition with a pass condition where the comparing the failed actual output entity to the expected output entities in the window of valid expected entities leads to a match between the failed actual output entity and any one of the valid expected entities in the window.

3. A method according to claim 1, further comprising:
    generating test program information, including creating a bus layout file.

4. A method according to claim 3 wherein the creating a bus layout file includes:
    identifying the device complexity.

5. A method according to claim 4 wherein the step of defining a window includes:
    establishing a range of valid entities for the actual entities to fall within based upon the device complexity and typeorder.

6. A method according to claim 1, further comprising:
    generating test program information, including producing a list of packet and control entities.

7. A method according to claim 1 wherein each entity comprises a packet or control signal according to a serial or parallel communications protocol.

8. A computer-readable medium having stored thereon sequences of instructions which, when executed, cause one or more electronic systems to carry out the steps:
    generating test signals with a semiconductor tester;
    applying the generated test signals to the device-under-test (DUT);
    capturing actual output entities from the DUT in response to the applied generated test signals;
    comparing the actual output entities to expected output entities, the actual output entities and the expected output entities each being ordered to create a correspondence between the actual output entities and the expected output entities, and identifying a failed actual output entity where a comparison fails to match an actual output entity to a corresponding expected output entity; and
    when failed actual output entity is identified in the comparing step, defining a window of valid expected entities relative to the corresponding expected output entity and comparing the failed actual output entity to expected output entities in the window of valid expected entities.

9. A method for testing a semiconductor device that outputs non-deterministic data, the method comprising:
    a) capturing a plurality of actual values output by the semiconductor device, the actual values being in a first sequence, the first sequence comprising a first plurality of ordered sub-parts;
    b) indicating whether the plurality of actual values match a plurality of expected values, the expected values being in a second sequence, the second sequence comprising a second plurality of ordered sub-parts; and
    c) wherein indicating comprises indicating a match when each of the first plurality of ordered sub-parts matches a matching sub-part of the second plurality of ordered sub-parts, the matching sub-part being offset in the order of the second plurality of ordered sub-parts by less than a number of sub-parts from a corresponding sub-part, the corresponding sub-part being a subpart of the second plurality of sub-parts corresponding to the sub-part of the first plurality of ordered sub-parts, and the number being greater than one.

10. The method of claim 9, wherein each of the plurality of sub-parts comprises a packet of data.

11. The method of claim 10, wherein capturing a plurality of actual values comprises capturing a plurality of packets output by a communications port on the semiconductor device.

12. The method of claim 9, further comprising indicating that the semiconductor device is manufactured correctly based in part on the indication of whether the plurality of actual values match the plurality of expected values.

13. The method of claim 9, further comprising obtaining the number by performing steps comprising reading a value in a data file associated with the semiconductor device under test.

14. The method of claim 9, wherein indicating whether the plurality of actual values match the plurality of expected values, comprises:
- i) comparing each of the first plurality of ordered sub-parts to the corresponding sub-part; and
- ii) for each of the first plurality of ordered sub-parts that does not match the corresponding sub-part, comparing the sub-part to one or more sub-parts of the second plurality of ordered sub-parts, the one or more sub-parts being offset by less than the threshold number of sub-parts from the corresponding sub-part.

15. The method of claim 14, wherein comparing the sub-part to one or more sub-parts of the second plurality of ordered sub-parts comprises comparing the subsequence to one or more sub-parts offset from the corresponding sub-part in either a positive or negative direction.

* * * * *